Feb. 25, 1930.  R. H. RANGER  1,748,730
RADIO RECEIVING SYSTEM
Filed Aug. 12, 1922
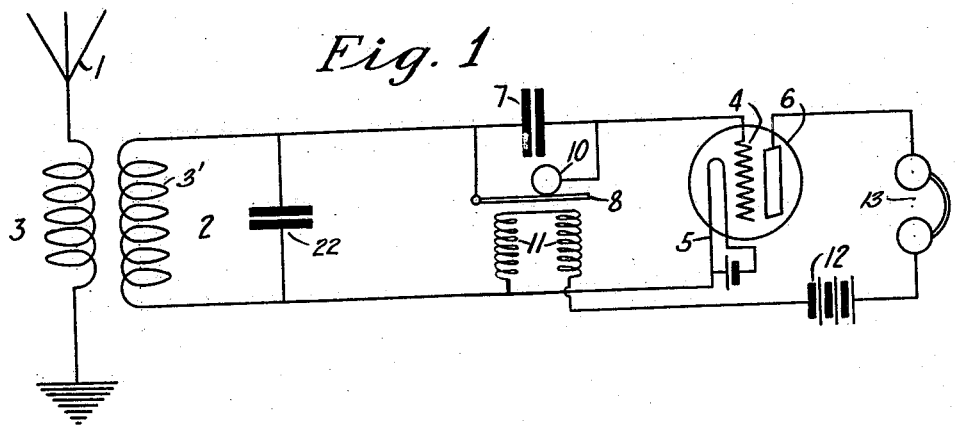
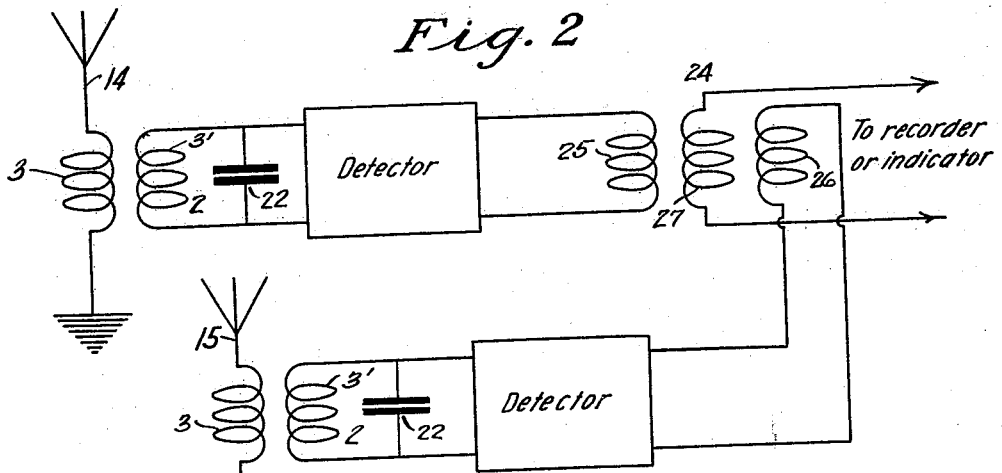
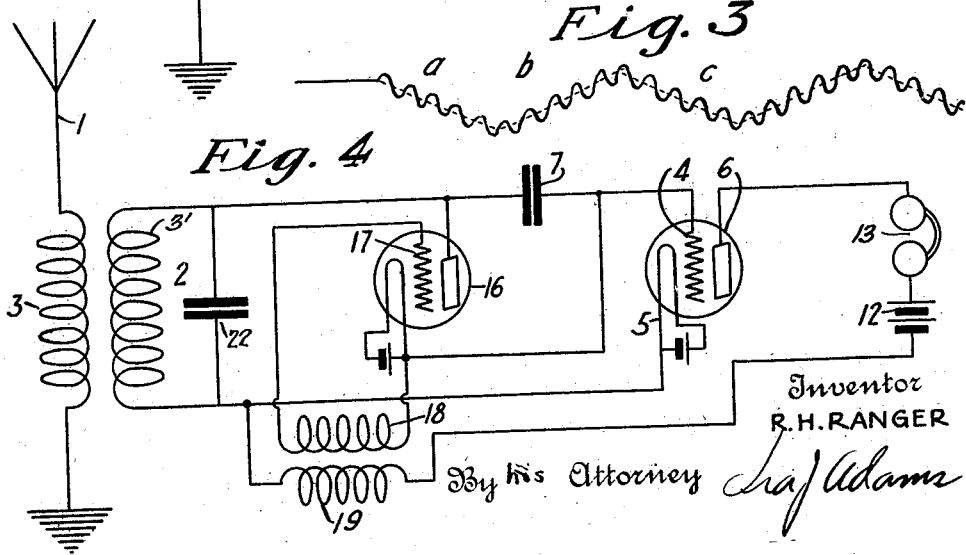
Inventor
R. H. RANGER
By his Attorney Patented Feb. 25, 1930

1,748,730

UNITED STATES PATENT OFFICE

RICHARD HOWLAND RANGER, OF BROOKLYN, NEW YORK, ASSIGNOR TO RADIO CORPORATION OF AMERICA, A CORPORATION OF DELAWARE

RADIO RECEIVING SYSTEM

Application filed August 12, 1922. Serial No. 581,349.

This invention relates to high frequency signalling and particularly to a detector for modulating or translating undamped radio frequency currents to convert them into currents having an audible or superaudible frequency component.

The improvement is especially designed and has for its object the elimination of the heterodyne, synchronous detector, chopper or other known devices which are ordinarily used in the detection of undamped radio frequency oscillations.

My invention also has for its object the provision of a simple and convenient means for cumulatively combining audio frequency currents from two or more receiving stations differently located with respect to the transmitting station and differentially combining interference from undesired signals or static.

The novel features which I believe to be characteristic of my invention are particularly set forth in the appended claims, the invention itself, however, both as to its construction and mode of operation together with further objects and advantages thereof, will best be understood by reference to the following description taken in connection with the accompanying drawings in which:

Fig. 1 is a diagrammatic representation of a receiving system embodying the invention.

Fig. 2 is a diagrammatic representation of two cooperating receiving systems embodying the invention.

Fig. 3 is a curve showing the variation in the output current of the detector.

Fig. 4 is a diagrammatic representation of a modification of the receiving system.

In accordance with the invention I utilize a vacuum valve, such as a three-electrode valve as a detector by providing it with a grid condenser, a grid leak and means for varying the resistance of the grid leak at an audible or superaudible frequency. The plate current will vary at the same frequency as the resistance of the grid leak and this variation may be indicated in any manner, as for example, by a telephone, recorder or a relay. Preferably the detector is arranged so that the variation of the grid leak resistance is produced by cooperation with the plate current.

In Fig. 1 I have shown by way of example, a convenient arrangement utilizing the features set forth. The antenna 1 is coupled to the receiving circuit 2 consisting of the usual inductive coupling 3' and the capacity element 22 by way of coils 3 and 3' and the terminals of the receiving circuit are connected to the grid 4 and filament 5 of the three-electrode valve 6 in a well known manner. A condenser 7 is connected to the grid and shunted by a grid leak. The resistance of the grid leak is varied at an audible frequency as previously set forth. Although this may be done in various ways a convenient arrangement as shown in the illustration comprises a microphone having a diaphragm 8 and a contact 10 similar to an ordinary telephone transmitter. The microphone is constructed so as to have a high resistance of the order of magnitude of 100,000 ohms and for this reason high resistance granules of carbon, for example, will be used instead of the ordinary granules. The plate circuit of the valve includes a winding 11, for attracting the diaphragm so as to vary the contact resistance, a battery 12 and telephone 13.

When radio frequency currents are impressed on the grid 4 from the receiving circuits a negative charge gradually accumulates on the condenser during the time the signal is being received. With an ordinary grid leak this gradually decreases the plate current and the grid may even become sufficiently negative to prevent any current from flowing from the plate to the filament. When the signal ceases the negative charge discharges through the grid leak. With the ordinary arrangement this variation will at the most give only a click in the telephone at the beginning and end of each signal and the dots and dashes cannot be interpreted therefrom. By utilizing the variable grid leak the decrease of the plate current decreases the resistance of the microphone by pressing the diaphragm against the carbon granules. This allows the accumulated negative charge on the grid to discharge more rapidly and brings the plate current back to normal value. This process is repeated at a period determined by the construction of the grid leak, particularly the diaphragm of the microphone and adjustment is made to give an audible frequency variation.

In the curve of Fig. 3 the decrease of the output or plate current due to the accumulating negative charge corresponds to portion $a$ of the curve. The increase of the plate current due to the effect of decreasing the resistance of the grid leak is indicated by the portion $b$ and the dotted line $c$ shows the effective audio frequency component which is heard in the telephones.

In place of a microphone, a second three electrode tube 16 may be used as a grid leak as shown in Fig. 4. The plate-filament gap of this tube is connected across the grid condenser 7 of tube 6 and serves as the resistance of the grid leak. The grid filament circuit of the tube 16 is coupled, for example, by the coils 18, 19 to the plate circuit of the tube 6. The plate circuit of the detector tube 6 reacts back on to the grid of the added tube 16 to vary the plate-filament resistance of the latter tube in substantially the same manner as the microphone resistance is varied by the coil 11 in Fig. 1.

The detector has special utility in connection with the arrangement of Fig. 2. In this illustration with two antennæ 14, 15 located at widely different points, it is desired to combine the audio frequency currents cumulatively and to do this the relative phases of the two audio frequency currents must be fixed. The signals received on the antenna members 14 and 15 are directed to the detectors, as above described, and, as shown on Fig. 2, similar numerals refer to elements corresponding to those described in connection with Figs. 1 and 4. By using detectors of the kind described, the phase of each of the audio frequency currents will be dependent on the time when the signal reaches each station. The difference between the phases of the audio frequency currents is therefore fixed for a given desired signal by the separation of the antenna and they may be cumulatively combined in a common receiver or recorder by means of a suitable transformer 24, of which the primary windings 25 and 26 are connected respectively with antenna members 14 and 15, and the secondary winding 27 connects with any suitable type of recorder or indicator. When undesired signals are received from some other direction the phase of the audio frequency currents will be different and they will differentially combine so that their effect on the receiver is lessened. Static effects likewise will tend to cancel as they will not give the same phase difference as the signal unless they come from the same direction.

If desired, for example, for purposes such as telephony, the grid leak resistance change may be made at a superaudible rate. By tuning the receiving circuit to the superaudible frequency, increased selectivity may be obtained. The devices may be used as outlined above for cumulative addition of signals received from widely separate antennæ and no tone will be noticed in the reception to disturb the modulation.

Having described my invention, what I claim is:

1. A radio receiving system having a three electrode tube and a condenser in the grid lead of said tube, a variable leak resistance shunting said condenser and means controlled by the output energy of said tube for varying the negative bias on the input electrode of said tube.

2. A radio receiving system having a triode detector tube, a condenser in the input circuit of said tube, a variable resistance shunting said condenser and means controlled by the output current of said triode for continuously varying the said resistance value in accordance with the received signals.

3. In a radio receiving system, a vacuum tube having a filament, grid and plate element, a condenser in the grid lead of said tube, a leak resistance shunting said grid condenser and means operable from variations in the plate current of said tube for continuously varying the value of said resistance.

4. In a radio receiving system, a vacuum tube having a condenser shunted by a conducting leak resistance connected to the input electrode of said tube and means controlled from the output circuit of said tube for varying the negative bias on the said input electrode of said tube in accordance with the received signals.

5. In a radio receiving system, a vacuum valve having filament, grid and plate electrodes, a condenser connected to said grid and a grid leak resistance associated with the grid and shunting said condenser, and means for causing the plate current to vary the resistance of the grid leak at a desired frequency.

6. A three electrode vacuum tube having a condenser shunted by a grid leak connected to the input circuit of said tube and means for continuously varying the amount of bias on said tube, said last named means being controlled by the output energy of said tube.

7. In a radio receiving system a three electrode vacuum valve having a condenser associated with the grid of said valve, a second vacuum valve shunting said condenser, and means associated with the output of said first valve for varying the resistance of said second valve.

8. A vacuum valve having filament, grid and plate electrodes, a condenser and a grid leak resistance associated with the grid and shunting said condenser, and means for causing the plate current to vary the resistance of the grid leak at an audible frequency.

9. In a radio receiving system, an antenna circuit, a vacuum tube coupled thereto, a condenser connected to the input electrode of said tube, a second tube shunting said condenser and a coupling between the output of said first named tube and the input of said second tube whereby variations in the plate current of said first named tube are adapted to vary the resistance of said second named tube.

10. In a radio receiving system, a three element vacuum tube, a condenser connected with the input electrode of said tube, a resistance shunting said condenser and means controlled from the output of said tube for continuously varying the value of said resistance.

11. In a radio receiving system, a three electrode vacuum tube, a condenser connected to the input electrode of said tube, a second three element vacuum tube shunting said condenser and adapted to form a grid leak resistance for said first tube and means controlled by variations in the plate current flow in said first named tube for continuously varying the resistance value of said second named tube.

12. In a radio receiving system, a three electrode vacuum valve having a condenser associated with the grid member of said valve, a second vacuum valve shunting said condenser and means associated with the output of said first named valve for causing the said second valve to control the negative bias on the grid of said first valve.

13. In a radio receiving system, a vacuum tube having a control grid electrode, a condenser having one terminal connected to the said control grid, a second vacuum tube having the output circuit thereof connected to shunt said condenser and the input circuit thereof coupled to the output circuit of the first named vacuum tube, whereby the said second tube provides a grid leak resistance for said first named vacuum tube of a resistance value proportionate to the strength of current flowing through said first tube.

14. In a radio receiving system, an antenna circuit and a vacuum tube coupled thereto, a condenser connected to the input electrode of said tube, a second tube shunting said condenser and a coupling between the output circuit of said first named tube and the input circuit of said second tube whereby variations in the plate current of said first named tube are adapted to control through said second tube the negative bias on the grid element of said first named tube.

RICHARD HOWLAND RANGER.